July 3, 1962 — D. M. KNOX — 3,041,761
PICTURE DISPLAY MEANS
Filed March 16, 1960 — 3 Sheets-Sheet 1
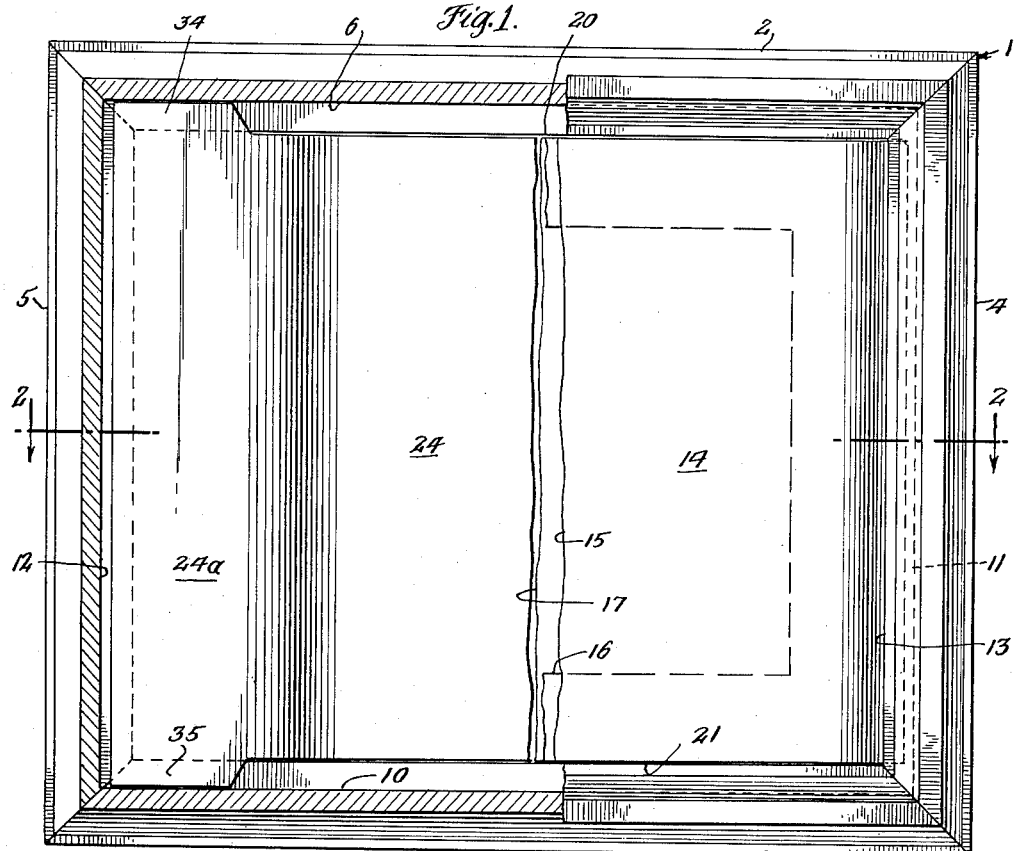
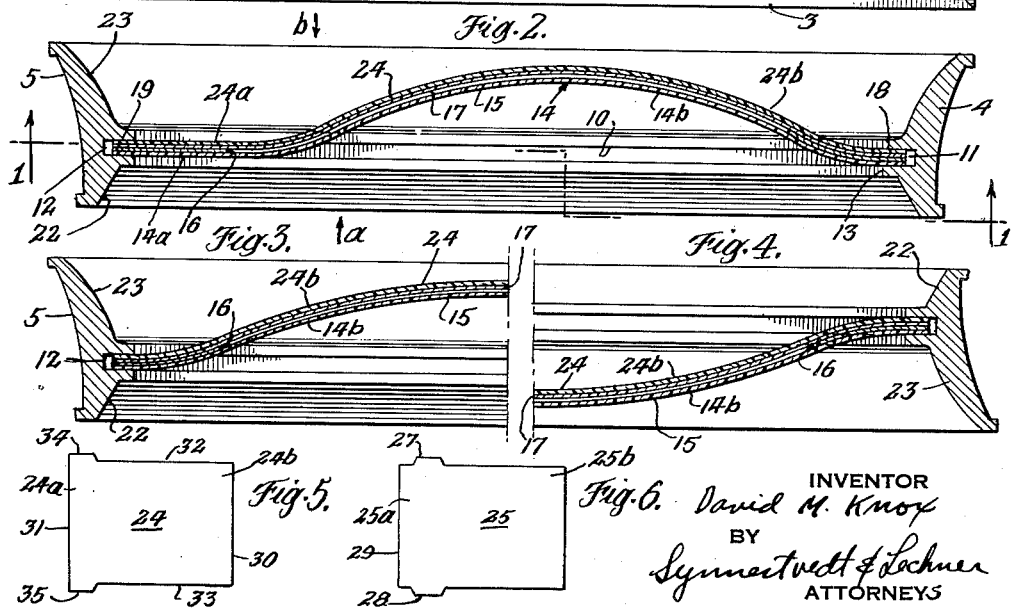
INVENTOR
David M. Knox
BY
Synnestvedt & Lechner
ATTORNEYS

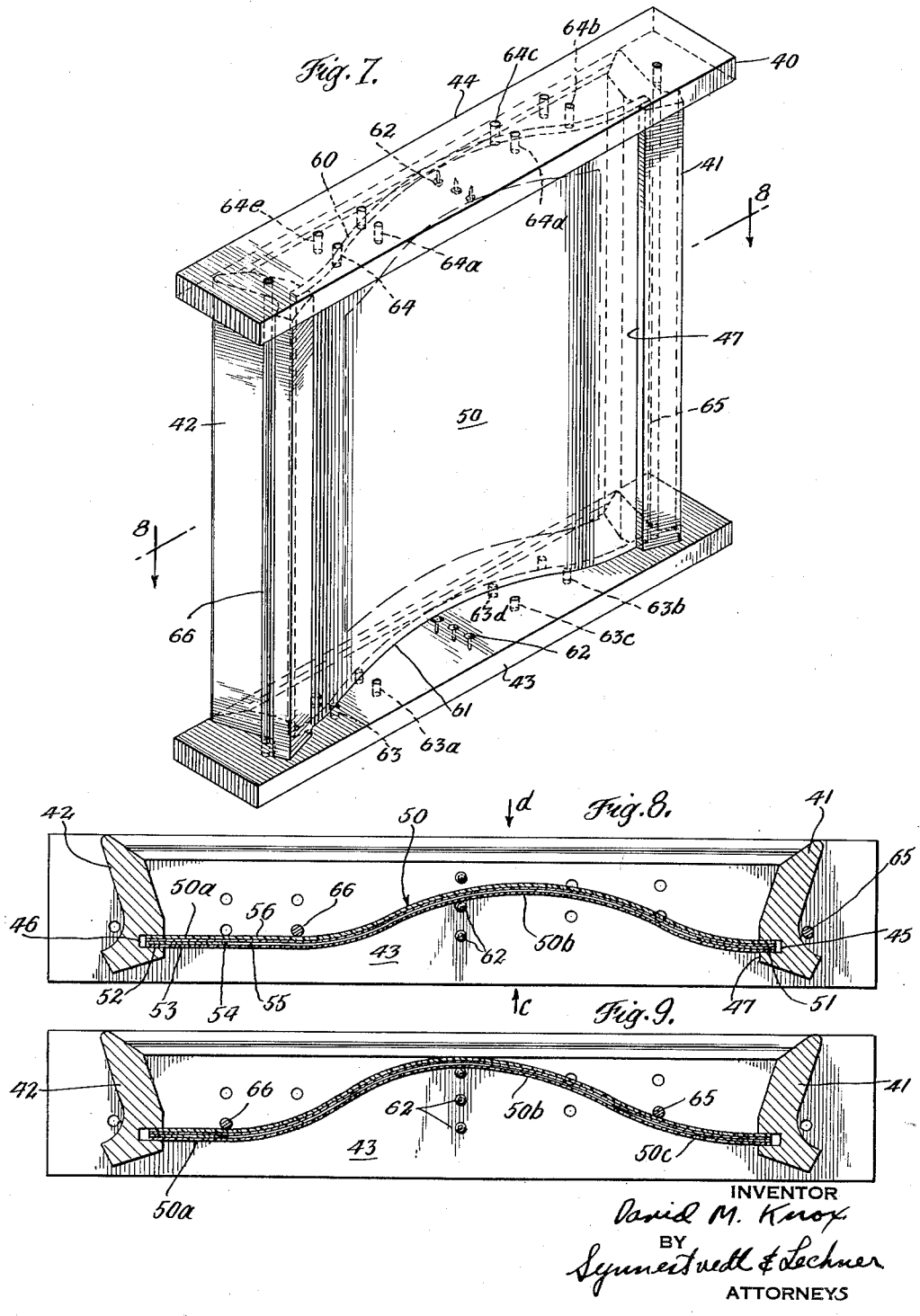

July 3, 1962 D. M. KNOX 3,041,761
PICTURE DISPLAY MEANS
Filed March 16, 1960 3 Sheets-Sheet 3
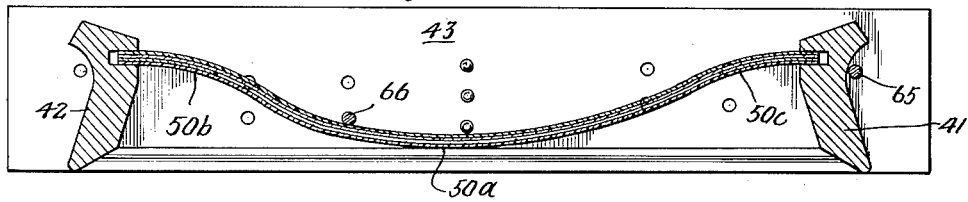
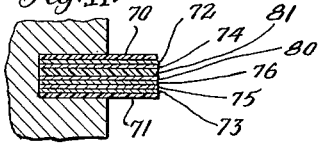
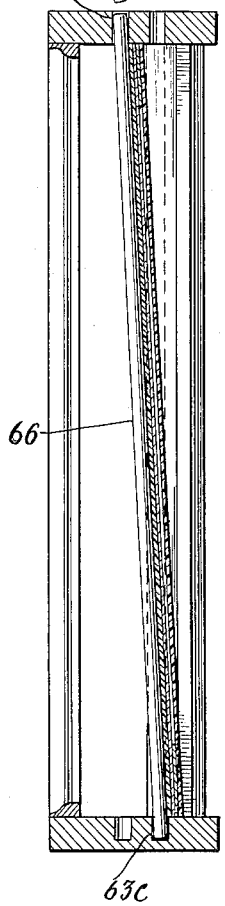
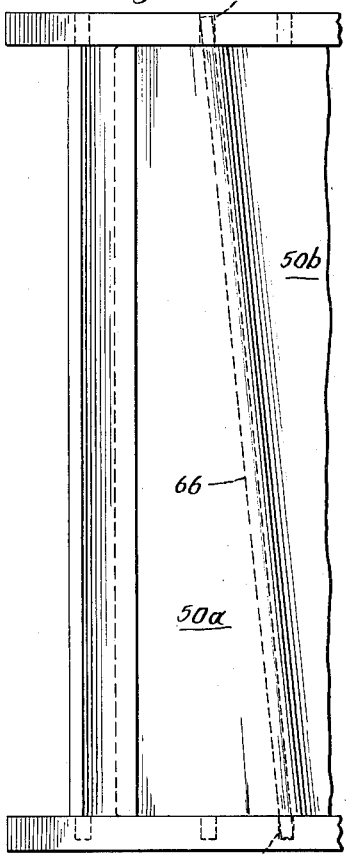
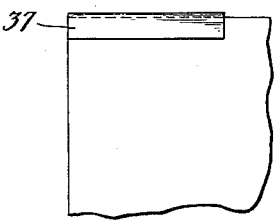
INVENTOR
David M. Knox
BY
Synnestvedt & Lechner
ATTORNEYS / # 3,041,761
PICTURE DISPLAY MEANS
David M. Knox, 310 E. 55th St., New York 22, N.Y.
Filed Mar. 16, 1960, Ser. No. 15,293
8 Claims. (Cl. 40—152)

This invention relates to picture display devices.

In one aspect the invention contemplates supporting a picture so that the picture surface is shaped in a fashion to create the most desirable viewing effect for the particular picture displayed, such shape being a composite of contoured and/or planar surface.

In another aspect the invention contemplates a picture display ensemble including a frame and a flexible picture assembly supported in the frame so that portions of the picture surface are planar or flat and other portions are non-planar or contoured together with means for controlling the forming of such portions.

In another aspect the invention contemplates a picture display ensemble including a frame and a flexible picture assembly supported in the frame so that part of the assembly has freedom to be bent or flexed into a contoured form to create a viewing effect wherein the picture surface is in part planar and in part contoured.

In another aspect the invention contemplates a picture display ensemble including a frame and a flexible picture assembly supported in the frame with freedom to be bent into a desired shape together with means alternatively usable for controlling the degree of bending or causing part of the assembly to be tilted with respect to the frame.

In another aspect the invention contemplates a picture display ensemble including a frame and a picture assembly supported in the frame along two opposite edges and with freedom to be bent or flexed into a contoured form together with means connected to the frame and extending between the unsupported edges of the assembly for controlling the degree of flexing.

In another aspect the invention contemplates a picture display ensemble including a frame and a flexible picture assembly supported in the frame with partial freedom for bending or flexing into a contoured form, the amount of flexing being controlled by barrier means extending across the frame aperture and preventing part of the assembly from flexing.

In another aspect the invention contemplates a picture display ensemble including a frame and a flexible picture assembly supported in the frame with partial freedom for bending or flexing into a contoured form together with barrier means controlling the amount of flexing, the barrier means being in the form of a flexible sheet, part of which is held in the frame in a manner to render the same non-flexible.

In another aspect the invention contemplates a picture display ensemble including a frame and a flexible picture assembly supported in the frame with partial freedom for bending or flexing into a contoured form together with barrier means controlling the amount of flexing, the barrier means being in the form of a rod or rods connected to the frame and extending across the frame aperture.

In still another aspect the invention contemplates a picture display ensemble including a frame and a flexible picture assembly supported in the frame with partial freedom for bending or flexing into a contoured form together with barrier means controlling the amount of flexing, the barrier means being in the form of a rod extending across the frame aperture and mountable on the frame in any of several different positions.

The manner in which the invention is constructed will be apparent from the following description and drawings wherein:

FIGURE 1 is in part a front elevation and in part a section taken on the line 1—1 of FIGURE 2 of a picture ensemble incorporating the invention;

FIGURE 2 is a plan section on the line 2—2 of FIGURE 1 and illustrating in particular a picture assembly shaped by a planar and a contoured surface;

FIGURE 3 is a half plan section illustrating a change in the shaping of the assembly of FIGURE 2;

FIGURE 4 is a half plan section illustrating a further change in the shaping of the assembly of FIGURE 2;

FIGURE 5 is a detailed view of the contour sheet;

FIGURE 6 is a detailed view of a modified contour sheet;

FIGURE 7 is an isometric view of a picture display ensemble incorporating a modification of the invention;

FIGURE 8 is an enlarged plan section taken on the line 8—8 of FIGURE 7 and illustrating a picture assembly shaped by a planar and a contoured surface.

FIGURE 9 is a section similar to the section shown in FIGURE 8 and illustrating a change in the shaping of the assembly of FIGURE 8;

FIGURE 10 is a view similar to the section shown in FIGURE 8 and illustrating a change in the shaping of the assembly;

FIGURE 11 is a fragmentary view of a picture assembly;

FIGURE 12 is a vertical cross section illustrating how the barrier means can be used to tilt the plane of the picture with respect to the frame;

FIGURE 13 is a front fragmentary view illustrating how the barrier means can be further used to shape the plane of the picture; and FIGURE 14 is a fragmentary view illustrating a means for obtaining frictional engagement between the picture ensemble and the frame.

In my copending application entitled Picture Displays and filed concurrently herewith I have disclosed the construction of a picture display ensemble including a frame and a picture assembly mounted therein with freedom to be bent or flexed into a contoured shape. This type of construction is used herein.

FIGURES 1–6 illustrate means for supporting a picture assembly so that the surface of the picture has a portion which is planar and another portion which is contoured either concavely or convexly from the point from which it is viewed. The concave portion creates a three-dimensional effect; i.e., the picture appears not only to have length and width, but has a dimension along its viewing axis.

In FIGURE 1 the frame 1 comprises long sides or moldings 2 and 3 and short sides or moldings 4 and 5. The long sides have grooves 6 and 10 and the short sides have grooves 11 and 12. The generally rectangular construction of the frame forms an aperture 13 and the grooves, being coplanar, form a continuous groove which is open to the aperture. A flexible picture ensemble 14 is disposed within the aperture. The assembly 14 comprises the transparency 15, the mat 16 and the picture 17, all of which are made of flexible material. The short edges 18 and 19 of the assembly are respectively supported in the grooves 11 and 12. The long edges 20 and 21 of the assembly are adjacent the long sides 2 and 3 but are unsupported so as to be free to move. The distance between the edges 18 and 19 is smaller than the distance between the bottoms of the grooves 11 and 12 so that the assembly can assume a wholly planar shape while disposed in the grooves. The edges 18 and 19 are free to move inwardly and outwardly of the grooves.

With reference to FIGURE 2 it will be noted that both sides of the frame are configured, for example, as indicated at 22 and 23 so as to create a different face effect when the picture is viewed from one side or the other, for example, as looking in the direction of the arrow *a* or the arrow *b*.

The above-described ensemble is similar in construction to the ensemble disclosed in my above-mentioned copending application.

In FIGURE 1 the means to control the shaping of the assembly comprises the contour sheet 24 which has a configuration as indicated in FIGURE 5. Alternatively, a contour sheet 25 having a configuration shown in FIGURE 6 may be used.

The sheet 24 is generally rectangular in shape with the short ends 30 and 31 being respectively disposed in the grooves 11 and 12. The long ends 32 and 33 are disposed adjacent to the long sides 2 and 3 but are unsupported so as to be free to move. The long ends 32 and 33 have a pair of projections 34 and 35 which are respectively disposed in the grooves 6 and 10. The contour sheet 24 is made of material which is less flexible than the material of the assembly.

Since the end 31 and the projections 34 and 35 of the contour sheet 24 are supported in the respective grooves, the portion 24*a* of the contour sheet is not free to flex. The portion 24*b*, however, being unsupported, is free to be flexed or bent into the desired contoured form, for example, as shown in FIGURE 2.

For assembly purposes the sheet 24 is first put into the frame. This is done by placing, say, the projection 35 in the groove 10 and then flexing the sheet and inserting the projection 34 in the groove 6, and adjusting the same to a planar shape. The assembly 14 is inserted by placing, say, the edge 18 in the groove 11, flexing the assembly and inserting the edge 19 in the groove 12 and then adjusting to a planar shape.

The flexing or bending of the contour sheet and assembly is done, for example, by pushing on the assembly 14 until the portion 14*b* of the assembly and the portion 24*b* of the sheet have assumed the desired shape. The portion 14*a* of the assembly, being in contact with the portion 24*a* of the sheet, is not free to be flexed. The portion 24*a* of the sheet forms a barrier and the portion 14*a* of the assembly remains planar.

It will be seen, therefore, that the sheet 24 controls the shaping of the assembly, particularly the degree of flexing or bending. For example, where the assembly is to be bent to a less degree, a sheet such as sheet 25 may be used. In the configuration of the sheet 25 the projections 27 and 28 are spaced farther from the edge 29 than are the projections 34 and 35 from the edge 31 of the sheet 24 so that the area 25*a* is wider than the corresponding area 24*a* and the area 25*b* is narrower than the corresponding area 24*b*. The planar portion of an assembly controlled by the sheet 25 will be wider than the planar portion controlled by the sheet 24 and the contoured portion will be narrower than the corresponding contoured portion.

The long ends 32 and 33 of the contour sheet 24 are in sliding engagement with the long sides 2 and 3 of the frame. This provides a frictional resistance against bending or flexing of the sheet and as such serves to hold the contour sheet in the particular position to which it is bent. Alternatively, friction means such as shown in my copending application may be used or both long edges of the contour sheet (or the whole assembly) may be provided with friction means such as tape 37 shown in FIGURE 14.

In FIGURE 2 it will be observed (looking in the direction of the arrow *a*) that the portions 14*a* and 24*a* are on the left-hand side and the portions 14*b* and 24*b* are on the right-hand side with the portions 14*b* and 24*b* being in concave form. Where the picture is to be viewed in the direction of the arrow *b*, the assembly 14 and the contour sheet 24 are changed in position; for example, the contour sheet 24 occupies the position of the transparency 15 and the mat and picture occupy reverse positions. With this transposition the portions 14*b* and 24*b* appear on the left-hand side and have a convex form.

As shown in FIGURE 3, a different face effect may be created simply by inserting the contour sheet in the frame reversed 180° from the position of FIGURE 2. In this instance the portions 14*a* and 24*a* appear on the right-hand side of the frame and the portions 14*b* and 24*b* appear on the left-hand side.

A still further change in viewing effect is illustrated in FIGURE 4 where the assembly 14 and the member 24, occupy the same relative positions as in FIGURE 1, except that the portions 14*b* and 24*b* are convex and the configured surface 23 is presented to the viewer.

In FIGURES 7–10 I have illustrated an ensemble having barrier means in the form of rods to control the shaping of the picture assembly.

In FIGURE 7 the ensemble 40 comprises the short sides 41 and 42 and long sides 43 and 44. As best indicated in FIGURE 8, the short sides 41 and 42 are respectively provided with the grooves 45 and 46. In this particular embodiment the long sides 43 and 44 are without grooves. The frame construction forms an aperture 47. A picture assembly 50 is disposed within the aperture, the short edges 51 and 52 of which are disposed in the grooves 45 and 46. The assembly 50 comprises the transparency 53, the mat 54, the picture 55 and backing member 56, all of these elements being constructed of flexible material. The assembly is inserted in the frame similarly as assembly 14. The long edges 60 and 61 of the assembly are preferably in sliding engagement with the long sides 43 and 44. The escutcheon pins 62 may be provided on the members 43 and 44 to serve as frictional means. The foregoing construction is similar to that disclosed in my above-mentioned copending application.

The long sides 43 and 44 are respectively provided with pairs of holes, for example, the hole 63 in side 43 and the hole 64 in side 44. The pair of holes are coaxial with one another. The hole 63 extends partially through the side 43 and the hole 64 extends completely through the side 44.

Similar holes are provided in the long sides 43 and 44. These holes are storing the rods 65 and 66. Either rod may be removed from the holes simply by grasping the same and moving upwardly through the hole in the member 43.

The rods 65 and 66 are used to control the contour of the assembly as is indicated in FIGURES 8 and 9. In FIGURE 8 it will be observed that the rod 66 is disposed in the holes 63*a* and 64*a*. The rod is inserted between these two holes by pushing the same down through the holes 64*a* until the end seats in the bottom of the lower hole 63*a*. The rod 66 permits the portion 50*a* of the assembly disposed between the side 42 and the rod 66 to be in an unflexed or planar condition. The remainder of the assembly is free to be flexed as desired, for example, flexed into the shape as indicated for the portion 50*b*.

In FIGURE 9 a different configuration is obtained by the use of both of the rods 65 and 66. The rod 66 is disposed in the holes 63 and 64 while the rod 65 is disposed in the holes 63*b* and 64*b*. Thus with this arrangement the planar portion 50*a* is of smaller dimension, the portion 50*b* is of different contour than in FIGURE 8, particularly in the depth of the contour, and the portion 50*c* is still of different contour.

In FIGURE 10 the rod 66 is used for controlling the shape of the assembly so that the portion 50*b* is concave and the portions 50*a* and 50*c* are of different contour than in FIGURE 9. In FIGURE 10 it will be noted that the rod 66 is disposed in the holes 63*a* and 64*a*.

In connection with FIGURES 7–10 it will be apparent that by proper disposition of a picture and transparency the picture may be viewed from either side of the frame; i.e., looking in the direction of the arrow *c* or in the direction of the arrow d (see FIGURE 8). Furthermore, the pattern of holes is such that the rods can be located to be in contact with the backing member for the various desired shapes of the assembly whether viewed in the direction of the arrow c or the arrow d.

In FIGURE 11 I have shown an assembly having a pair of pictures arranged so that one may be viewed from one side of the frame or the other viewed from the opposite side of the frame, the assembly including spare mats and pictures. The assembly comprises the transparencies 70 and 71, mats 72 and 73, pictures 74 and 75 to be viewed, spare mat 76, spare picture 80 and backing member 81. This type of assembly is used with any of the frames described above.

In FIGURE 12 I have shown how the contour rods may be used to control shaping so that part of the plane of the picture is slanted with respect to the frame. In such an instance the rod 66 may be disposed in the holes 63c and 64c. By pushing the assembly firm against the rod the portion of the assembly adjacent thereto will be slanted rearwardly; i.e., the top part of the assembly is farther from the observer than the bottom part. Thus the contour of the picture will be somewhat wider at the top than at the bottom. The position of the rod may be reversed, for example, supported in the holes 63d and 64d so that the portion of the assembly adjacent the rod will be slanted toward the front.

A further variation of the shaping of the assembly may be obtained by disposition of the rod such as indicated in FIGURE 13 where it will be seen that the rod 66 is supported at its lower end in the hole 63a and at its upper end in the hole 64e. In this instance the portion 50a of the picture assembly will be slanted toward the rear with the slanting area tapering in the vertical direction. The portion 50b of the assembly will have an asymmetrical concave or convex contour.

I claim:
1. An ensemble for the display of pictures comprising:
 a generally rectangular-shaped frame formed with a generally rectangular-shaped four-sided aperture;
 means forming grooves respectively on the first and second sides of said aperture, the first and second sides being opposite one another and the grooves facing one another;
 a generally rectangular-shaped picture assembly in said aperture comprising a picture made of flexible material and flexible sheet means supporting the picture, the dimensions of the picture assembly as between said first and second sides of the aperture being greater than the distance between the sides to provide for two opposite edges of assembly to be disposed in and make a sliding contact respectively with said grooves and the dimensions of the assembly as between the third and fourth sides of the aperture being substantially the same as the distance between the sides to provide for the other two edges of the assembly to respectively make sliding contact with the third and fourth sides of the aperture, said flexibility and said sliding contact providing for the assembly to be bendable into a contoured shape; and
 mechanism on said frame connected to and extending between said third and fourth sides and forming a barrier means across said aperture to be engaged by said assembly for controlling the degree of bending.

2. A construction in accordance with claim 1 wherein said mechanism includes a rod connected to and extending between said third and fourth sides.

3. A construction in accordance with claim 1 further including a plurality of holes formed in said third and fourth sides and wherein said mechanism includes a rod one end of which is disposed in a hole in the third side and the other end of which is disposed in a hole in the fourth side.

4. A construction in accordance with claim 3 wherein said rod is disposed in holes which are coaxial.

5. A construction in accordance with claim 3 wherein said rod is disposed in holes which are not coaxial.

6. A construction in accordance with claim 3 wherein there are a plurality of rods.

7. A construction in accordance with claim 3 wherein there are additional holes respectively in said first and second sides and spaced from said aperture for use in storing said rod.

8. An ensemble for the display of pictures and the like comprising:
 a generally rectangular-shaped frame formed with a generally rectangular-shaped four-sided aperture;
 means forming grooves respectively on said first and second sides of said aperture and on the third and fourth sides of said aperture, the first and second sides being opposite one another and the grooves therein facing one another and the third and fourth sides being opposite one another and the grooves therein facing one another;
 a generally rectangular-shaped picture assembly in said aperture comprising a picture made of flexible material and flexible sheet means supporting the picture, the dimensions of the picture assembly as between said first and second sides of the aperture being greater than the distance between the sides to provide for two opposite edges of said picture assembly to be disposed in and make a sliding contact respectively with said grooves and the dimensions of the assembly as between the third and fourth sides of the aperture being substantially the same as the distance between the sides to provide for the other two edges of the picture assembly to respectively make sliding contact with the third and fourth sides of the aperture, said flexibility and said sliding contact providing for the assembly to be bendable into a contoured shape;
 a generally rectangular-shaped contour sheet made of flexible material and engaging said assembly, the dimensions of the sheet as between said first and second sides of the aperture being greater than the distance between the sides to provide for two opposite edges of the sheet to be disposed in and make a sliding contact respectively with the grooves in the first and second sides; and
 a pair of projections respectively disposed on the other edges of said contour sheet and the dimensions of the sheet between the projections being greater than the distance between the third and fourth sides to provide for the projections to be disposed in the grooves in the third and fourth sides and the dimensions of the remainder of the sheet being not greater than the distance between the third and fourth sides, the projections and the portion of the contour sheet between the projections forming a barrier to engage the assembly and prevent flexing of the assembly and the remaining portion of the contour sheet being capable of flexing with the assembly.

References Cited in the file of this patent
UNITED STATES PATENTS

| | | |
|---|---|---|
| 678,012 | Maratta | July 9, 1901 |
| 2,731,749 | Tarzian | Jan. 24, 1956 |
| 2,860,437 | Carroll | Nov. 18, 1958 |
| 2,961,789 | Hughes | Nov. 29, 1960 |

FOREIGN PATENTS

| | | |
|---|---|---|
| 1,088,058 | France | Mar. 2, 1955 |